US012761319B2

(12) United States Patent
Jiang

(10) Patent No.: US 12,761,319 B2
(45) Date of Patent: Oct. 13, 2026

(54) LASER RECEIVING SYSTEM AND LASER RANGING SYSTEM

(71) Applicant: SUTENG INNOVATION TECHNOLOGY CO., LTD., Shenzhen (CN)

(72) Inventor: Shen Jiang, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 889 days.

(21) Appl. No.: 18/118,785

(22) Filed: Mar. 8, 2023

(65) Prior Publication Data

US 2023/0288538 A1 Sep. 14, 2023

(30) Foreign Application Priority Data

Mar. 9, 2022 (CN) ........................ 202210235039.6

(51) Int. Cl.
*G01S 7/48* (2006.01)
*G01S 7/481* (2006.01)
*G01S 17/931* (2020.01)

(52) U.S. Cl.
CPC .......... *G01S 7/4808* (2013.01); *G01S 7/4814* (2013.01); *G01S 7/4816* (2013.01); *G01S 17/931* (2020.01)

(58) Field of Classification Search
CPC .... G01S 7/4808; G01S 17/931; G01S 7/4814; G01S 7/4816
See application file for complete search history.

(56) References Cited

U.S. PATENT DOCUMENTS

| | | | | |
|---|---|---|---|---|
| 4,521,107 | A | 6/1985 | Chaborski et al. | |
| 10,200,067 | B1 | 2/2019 | Adabi et al. | |
| 2017/0131142 | A1 | 5/2017 | Luk et al. | |
| 2018/0341020 | A1 | 11/2018 | Magee et al. | |
| 2019/0086517 | A1* | 3/2019 | Puglia | G01S 17/32 |
| 2020/0088853 | A1* | 3/2020 | Kubota | G01S 7/4865 |
| 2021/0132197 | A1* | 5/2021 | Wachter | G01S 7/4802 |
| 2021/0270965 | A1* | 9/2021 | Liu | G01S 7/489 |

FOREIGN PATENT DOCUMENTS

| | | | |
|---|---|---|---|
| AU | 2020103610 | A4 | 2/2021 |
| CN | 109407075 | A | 3/2019 |
| CN | 109870702 | A | 6/2019 |
| CN | 110244311 | A | 9/2019 |
| CN | 111352097 | A | 6/2020 |

OTHER PUBLICATIONS

First Office Action issued in related Chinese Application No. 202210235039.6, mailed Jan. 20, 2023, 7 pages.

* cited by examiner

*Primary Examiner* — Daniel C Puentes
(74) *Attorney, Agent, or Firm* — BAYES PLLC

(57) ABSTRACT

This application provides a laser receiving system, which includes a receiver, a transimpedance amplification circuit, and at least one measurement circuit. The at least one measurement circuit includes a first measurement circuit, where the receiver is connected to a terminal of the transimpedance amplification circuit, and is configured to receive an echo laser beam and output an echo signal. The transimpedance amplification circuit has a terminal connected to the receiver and another terminal separately connected to each of the at least one measurement circuit, and is configured to perform transimpedance amplification on the echo signal. The first measurement circuit is configured to output a sampling signal after shaping the echo signal.

8 Claims, 11 Drawing Sheets

LASER RECEIVING SYSTEM AND LASER RANGING SYSTEM

CROSS-REFERENCE TO RELATED APPLICATION

The present application claims the benefit of priority to Chinese Patent Application No. 202210235039.6, filed on Mar. 9, 2022, which is hereby incorporated by reference in its entirety.

TECHNICAL FIELD

This application relates to the technical field of laser beams, and in particular, to a laser receiving system and a laser ranging system.

BACKGROUND

LiDARs have been widely applied to the ranging field by now, and in particular, to vehicles to detect surrounding environments. A LiDAR includes an emitter, a receiver, and a scanning device. A receiver based on a single-photon principle has excellent photoelectric conversion capability, which can improve the ranging capability of the LiDAR.

However, stray light inside the LiDAR stimulates the receiver based on the single-photon principle, which affects the normal operation of the receiver, thereby seriously affecting the ranging capability and stability of the LiDAR.

SUMMARY

This application aims to provide a laser receiving system and a laser ranging system, to solve a ranging instability problem caused by stray light, thereby ensuring the ranging stability and accuracy of laser beams.

An aspect of this application provides a laser receiving system, including a receiver, a transimpedance amplification circuit, and at least one measurement circuit, and the at least one measurement circuit includes a first measurement circuit, where the receiver is connected to a terminal of the transimpedance amplification circuit, and is configured to receive an echo laser beam and output an echo signal; the transimpedance amplification circuit has a terminal connected to the receiver and another terminal separately connected to each of the at least one measurement circuit, and is configured to perform transimpedance amplification on the echo signal; and the first measurement circuit is configured to output a sampling signal after shaping the echo signal.

Another aspect of this application provides a laser ranging system, including the foregoing laser receiving system, a laser emission system, and a digital processing unit, where the laser emission system is used to emit a laser pulse, a detection period of the laser ranging system includes a first detection period and a second detection period in sequence, the laser emission system emits a secondary laser pulse in the first detection period, the laser emission system emits a primary laser pulse in the second detection period, the first detection period is earlier than the second detection period, and power of the secondary laser pulse is less than power of the primary laser pulse; and the digital processing unit is configured to calculate the sampling signal output by the receiving system and then output target information.

The laser receiving system provided in the embodiments of this application can have the following technical effects.

The receiver receives the echo laser beam and outputs the echo signal. The echo signal output by the receiver is transimpedance amplified by the transimpedance amplification circuit and then enters the measurement circuit. The echo signal is shaped by the measurement circuit to obtain the sampling signal. Because the stray light generated inside the laser ranging system reaches the receiver, the echo laser beam received by the receiver includes stray light and a detection echo, the echo signal output by the receiver also includes impurities of the stray light signal and the detection echo signal, and the stray light signal and the detection echo signal are overlapped with each other. After shaping, a pulse width of the echo signal is compressed, the stray light signal and the detection echo signal are both shaped into rapid-recovering signals, and the first measurement circuit can distinguish between the stray light signal and the detection echo signal. The echo signal is shaped before sampling, so that the overlapped stray light signal and detection echo signal can be distinguished and identified, to reduce the impact of the stray light signal and a detection inaccuracy problem caused by the stray light, thereby ensuring ranging stability and accuracy of the LiDAR.

BRIEF DESCRIPTION OF DRAWINGS

The accompanying drawings herein are incorporated in this specification as a part of this specification, show embodiments in compliance with this application, and are used together with this specification to illustrate a principle of this application. Apparently, the accompanying drawings in the following descriptions show merely some embodiments of this application, and a person of ordinary skill in the art may derive other drawings from these accompanying drawings without creative efforts.

DETAILED DESCRIPTION

Figure 1A:
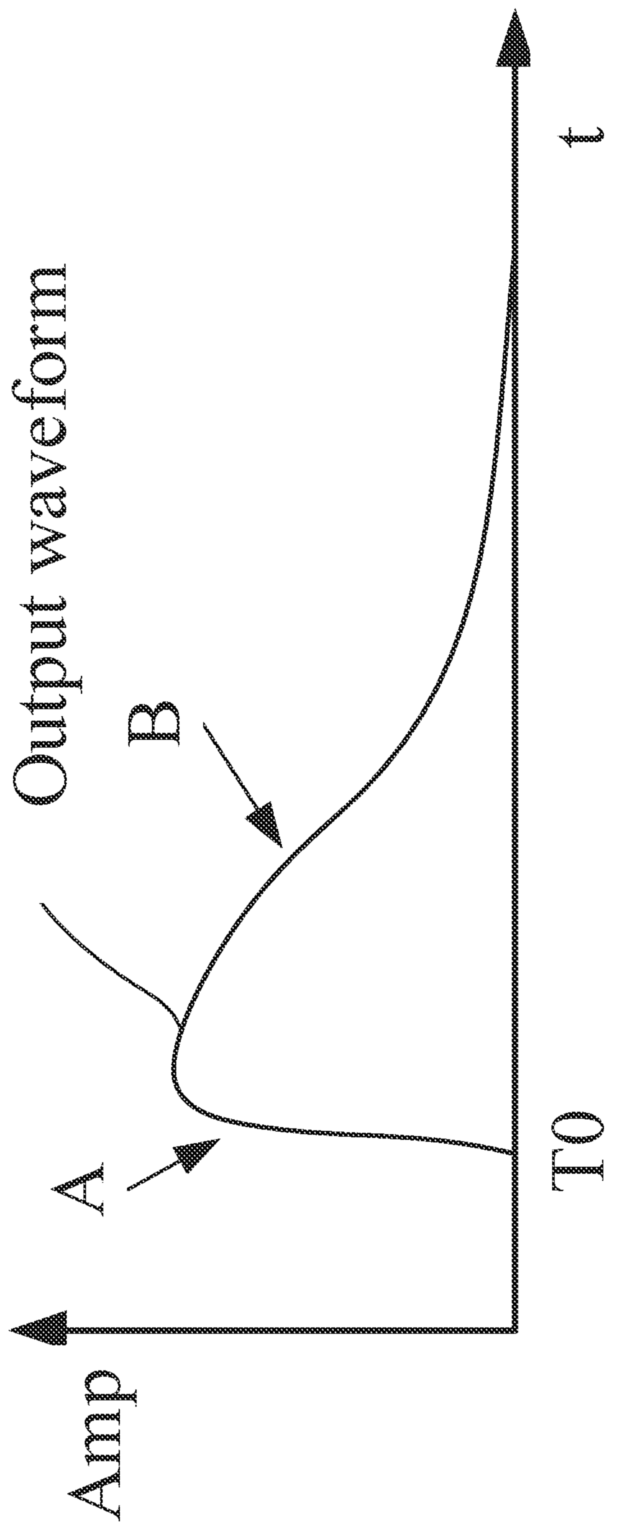
FIG. 1*a* is a schematic diagram of an example of an output waveform of a single-photon receiver.

To make objectives, technical solutions, and advantages of the present application clearer, embodiments of the present application are described in further detail below with reference to the drawings.

When the following description refers to the drawings, unless otherwise indicated, the same numbers in different drawings indicate the same or similar elements. The implementations described in the following exemplary embodiments do not represent all implementations consistent with the present application. On the contrary, the implementations are merely examples of devices and methods consistent with some aspects of the present application as detailed in the appended claims.

Then the exemplary embodiments are described with reference to the accompanying drawings. However, exemplary embodiments can be implemented in various forms and should not be construed as being limited to examples illustrated herein; instead, these embodiments are provided so that this application is more comprehensive and complete and a concept of the exemplary embodiments is thoroughly communicated to a person skilled in the art. The features, structures, or characteristics may be integrated into one or more embodiments in any applicable method. In the following descriptions, many specific details are provided for ease of full understanding of the embodiments of this application. However, a person skilled in the art should understand that, to implement a technical solution in this application, one or more specific details may be omitted, or other methods, components, apparatuses, steps and the like may be used. In another case, well-known technical solutions are not specifically shown or described, to avoid dominating and blurring aspects of this application.

In addition, the accompanying drawings are merely schematic diagrams of this application and are not necessarily drawn to scale. The same reference signs in the figures denote the same or similar parts, and therefore are not described repeatedly. Some block diagrams shown in the figures are functional entities and are not necessarily corresponding to physically or logically independent entities. These functional entities may be implemented in a form of software or may be implemented in one or more hardware modules or integrated circuits, or in different networks and/or processor apparatuses and/or microcontroller apparatuses.

LiDAR (Light Detection And Ranging), also referred to as optical radar, is an abbreviation of light detection and ranging, mainly measures a distance by measuring the transmission time of photons from the emitter and the receiver to the target object, and can also analyze information such as a value of reflected energy on a surface of a target object, and amplitude, frequency, and phase of a reflected spectrum, to obtain precise three-dimensional structure information of the target object.

In conventional LiDAR detection technologies, a linear detector is used, that is, a detector responds linearly to light intensity. The system structure of the mechanism is simple and reliable, but the detector has an insufficient dynamic receiving range and a limited detection distance. To increase the detection distance, system caliber or emission power needs to be increased, which is often impossible in some applications.

However, the receiver based on the single-photon principle has the capability of responding to the single photon, has higher detection sensitivity than a conventional linear photodetector, and has a much greater detection distance limit than the linear detector with the same laser beam emission power, which can greatly increase a functional distance of the system. Currently, LiDAR using the single-photon receiver is gradually replacing conventional LiDARs.

The output waveform of the single-photon receiver refers to a waveform of a photocurrent signal output during an avalanche effect and quenching process after the excitement of a single-photon unit. FIG. 1*a* is a schematic diagram of an output waveform of a single-photon receiver. As shown in FIG. 1*a*, a rising region A shows a current change of rapid avalanche, and a falling region B shows a process in which a current returns to zero after the quenching process. The rising region A lasts very short usually for hundreds of picoseconds, and the quenching process is related to internal quenching resistance and junction capacitance of the sensor and usually lasts for a few nanoseconds to tens of nanoseconds.

Figure 1B:
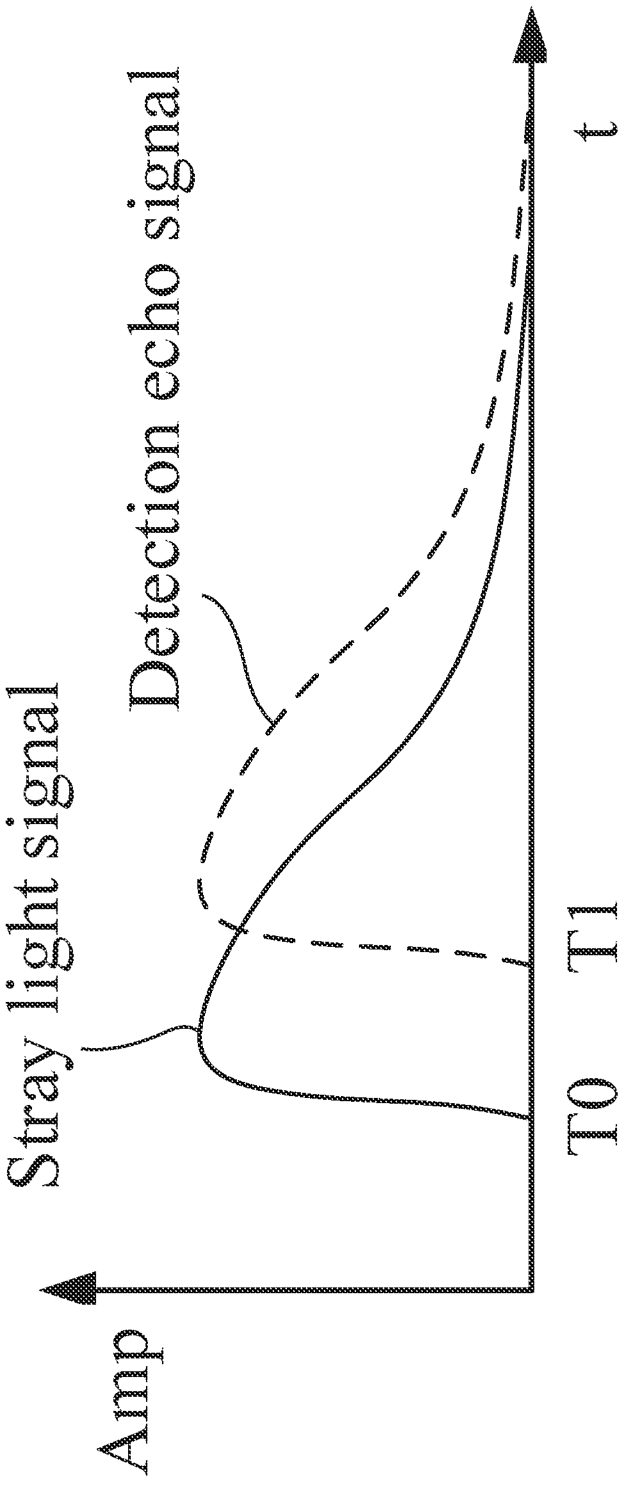
FIG. 1*b* is a schematic diagram of an example of an echo waveform.

When detecting a target at a short distance, the time required from the start of emission to reception of a detection echo reflected by the target at the short distance may be in a range of only tens of nanoseconds. When the laser beam is emitted, some stray light generated inside the LiDAR directly reaches the working surface of the receiver through a stray path. After receiving the stray light, the receiver excites some single-photon units and outputs a photocurrent signal. A stray light signal is an error signal. It can be learned from the foregoing description that the time required from self-excitation to complete quenching of the single-photon units ranges from several nanoseconds to tens of nanoseconds, and during such period when the waveform of the stray light signal does not completely recover to zero, the receiver receives the detection echo reflected by the target at the short distance, and outputs a detection echo signal. The waveform is shown in FIG. 1*b*. As shown in FIG. 1*b*, the solid-line waveform generated at time T0 belongs to the stray light signal, and the dotted-line waveform generated at time T1 belongs to the detection echo signal, and the two waveforms are overlapped with each other and intersected. Due to a short time interval between the stray light and the detection echo of the target at a short distance, after responding to the stray light, the single-photon receiver still does not completely recover to a normal working status after quenching. The short-distance detection echo already reaches the receiver, and the stray light signal and the detection echo signal are overlapped with each other, which renders it difficult to effectively identify the detection echo signal and impossible to effectively detect the object at the short distance, thereby causing a blind spot for short-distance detection of the LiDAR.

Figure 1C:
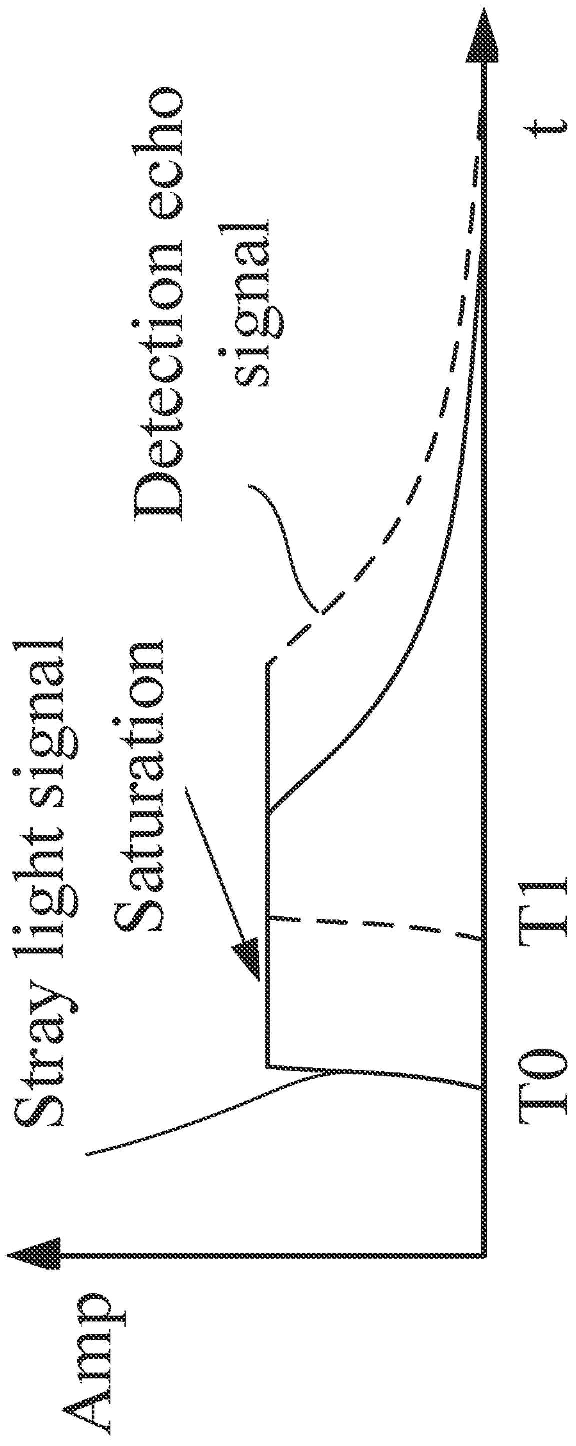
FIG. 1*c* is a schematic diagram of an example of a saturated signal waveform.

In addition, in the prior art, to ensure a long-distance detection capability of the LiDAR using the receiver based on the single-photon principle, the emission power needs to be increased to a larger value or the maximum value, and gains of the echo signal also need to be significantly increased. As a result, more stray light is generated inside the LiDAR, energy of the stray light is relatively increased. Massive single-photon units on the receiver are excited to output a large number of stray light signals. After passing through the transimpedance amplification circuit with large gains, the stray light signals directly cause output saturation at the rear end. FIG. 1*c* is a schematic diagram of an example of a saturated signal waveform. As shown in FIG. 1*c*, the stray light generated at time T0 causes output saturation, the stray light signals outnumber the detection echo signals, and the generated detection echo signal reflected by the target at the short distance at time T1 is totally unidentifiable. In this case, the detection echo signal is unidentifiable due to the output saturation, and therefore, it is difficult to accurately obtain the time when the detection echo signal reaches the receiver, thereby causing a blind spot for short-distance detection.

In view of this, this application provides a laser receiving system, including a receiver, a transimpedance amplification circuit, and at least two measurement circuits, and the at least two measurement circuits include a first measurement circuit. In the laser receiving system, the receiver receives an echo laser beam and outputs an echo signal. The echo signal output by the receiver is the transimpedance amplified by the transimpedance amplification circuit and then enters the measurement circuit. The echo signal is shaped by the measurement circuit, so that the overlapped stray light signals and detection echo signals can be distinguished, thereby reducing the impact of the stray light signals, solving the problem that short-distance detection echo signals are unidentifiable because of the stray light, and ensuring ranging stability and accuracy of the LiDAR.

Figure 2:
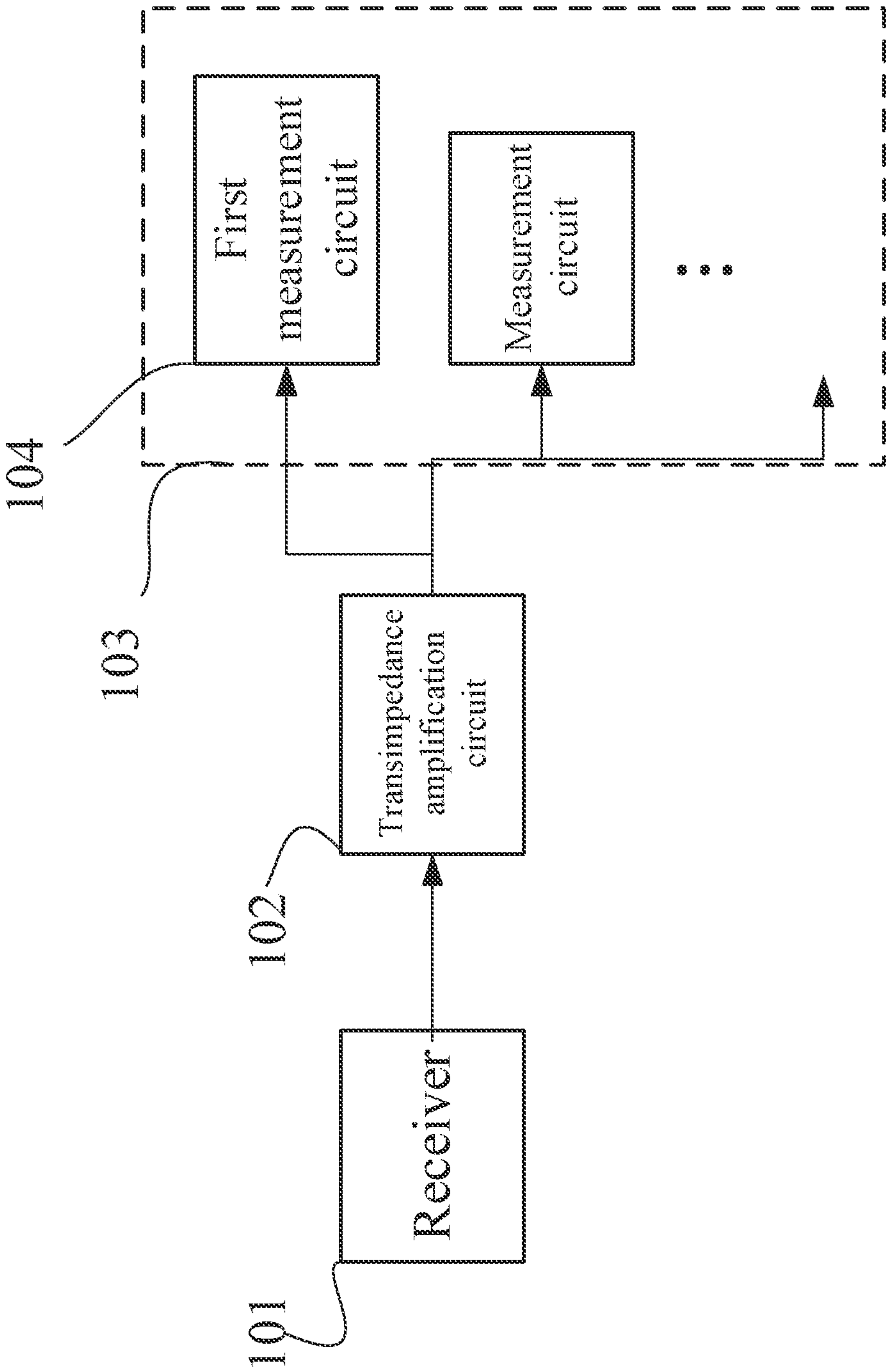
FIG. 2 is a systematic schematic diagram of a laser receiving system according to an embodiment of this application.

FIG. 2 is a systematic schematic diagram of a laser receiving system according to an embodiment of this application. As shown in FIG. 2, the laser receiving system includes a receiver 101, a transimpedance amplification circuit 102, and at least two measurement circuits 103, and the at least two measurement circuits include a first measurement circuit 104.

The receiver is connected to one terminal of the transimpedance amplification circuit, and another terminal of the transimpedance amplification circuit is connected to each of the measurement circuits, including the first measurement circuit and another measurement circuit.

The receiver is configured to receive the echo laser beam and output the echo signal.

In some embodiments, the receiver converts an optical signal of the received echo laser into an electrical signal for output.

In some embodiments, the receiver is a photoelectric sensor, and the photoelectric sensor can be a photoelectric sensor outputting a current or a voltage. If the photoelectric sensor is the photoelectric sensor outputting the current, the echo signal is a current signal; or if the photoelectric sensor is the photoelectric sensor outputting the voltage, the echo signal is a voltage signal. The photoelectric sensor can be a highly sensitive detector, for example, a combination of one or more of APD (Avalanche Photo Diode), SPAD (Single-Photon Avalanche Diode), and SiPM (Silicon Photomultiplier).

The echo laser beam is a laser beam received by the receiver within one measurement period. In an ideal case, the echo laser beam refers to a detection echo reflected by the target object after the laser pulse is emitted outwards and reaches the surface of the target object. However, due to stray light generated inside the LiDAR, the echo laser beams received by the receiver include the stray light and the detection echo of the target object at the short distance, and the stray light signal and the detection echo signal output by the receiver are mutually superimposed and mixed, which renders it difficult to distinguish the detection echo signal from the overlapped waveforms and renders the LiDAR unable to effectively or accurately detect the target object at the short distance.

The transimpedance amplification circuit is configured to amplify the echo signal output by the receiver, and input the amplified echo signal to the first measurement circuit and at least one more measurement circuit in addition to the first measurement circuit.

It can be understood that the echo signal output by the receiver is usually a relatively weak electrical signal, which is inconvenient for analysis. Therefore, the electrical signal output by the receiver is amplified by the transimpedance amplification circuit, and the amplified electrical signal is input to the measurement circuit.

In some embodiments, the transimpedance amplification circuit amplifies an echo signal for a small gain. The greater the transmission distance is, the more the laser pulse attenuates. The echo laser beam reflected by the target object at a short distance has large energy, and the echo signal generated after the echo laser beam passes through the receiver correspondingly has a large amplitude. In this case, the echo signal is amplified for the small gain, to prevent the amplified echo signal from being oversaturated and exceeding the maximum range of the subsequent measurement circuit that causes saturation distortion of the echo signal, loss of an original waveform characteristic, and analysis failure.

Further, if the echo signal output by the receiver after receiving the echo laser beam is a current signal, the transimpedance amplification circuit is also configured to convert the current signal into a voltage signal and amplify the signal.

Figure 3:
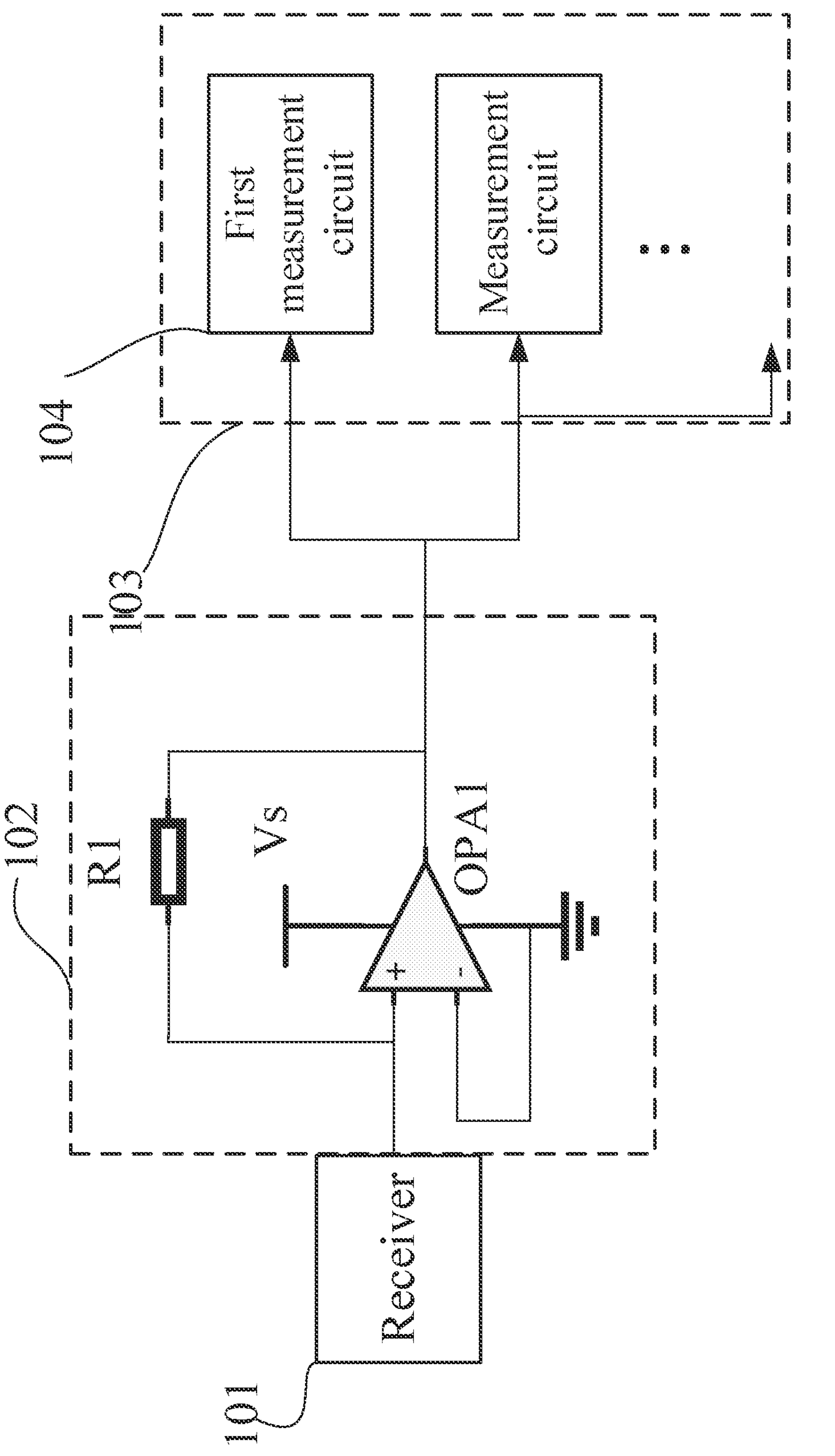
FIG. 3 is a schematic diagram of an example of a transimpedance amplification circuit according to an embodiment of this application.

FIG. 3 is a schematic diagram of an example of a transimpedance amplification circuit according to an embodiment of this application. As shown in FIG. 3, the transimpedance amplification circuit 102 includes an operational amplifier OPA1, a first direct current voltage source Vs, and a first resistor R1. A positive electrode of the operational amplifier OPA1 is connected to the first direct current voltage source Vs, a negative electrode of the operational amplifier OPA1 is grounded, a non-inverting input terminal of the operational amplifier OPA1 is connected to an output terminal of the receiver and a terminal of the first resistor R1, an inverting input terminal of the operational amplifier OPA1 is grounded, and an output terminal of the operational amplifier OPA1 is connected to another terminal of the first resistor R1 and the measurement circuit. The measurement circuit is configured to shape and sample the echo signal output by the transimpedance amplification circuit and then output a sampled signal.

Further, the at least two measurement circuits include the first measurement circuit, and the first measurement circuit is configured to shape an echo signal and then output a sampled signal.

It can be understood that when the echo signal also includes an impurity of the stray light signal, the stray light signal and the detection echo signal are overlapped with each other, and as a result, the detection echo signal is unidentifiable. As shown in FIG. 1*b*, a solid line formed at time T0 shows a waveform corresponding to the stray light signal, a dotted line formed at time T1 shows a waveform of the detection echo signal, and the solid line and the dotted line are intersected. The first measurement circuit can shape the echo signal output by the transimpedance amplification circuit, to compress the pulse width of the stray light signal and the detection echo signal, so that the stray light signal and the detection echo signal can quickly recover to zero after reaching the peak, that is, time of the falling region B of the stray light signal and the detection echo signal also becomes very short. In this way, the stray light signal and the detection echo signal having close peaks are separated from each other, and the detection echo signal is not overlapped with the falling region B of the stray light signal, thereby causing a mixing of the two signals. After the echo signal is shaped, the stray light signal and the detection echo signal are easy to identify. Further, the first measurement circuit accurately identifies the peak of the detection echo signal based on the shaped echo signal, outputs a sampled signal accordingly, and accurately outputs information about a short-distance detection echo.

In an embodiment, the first measurement circuit includes a first pulse shaping circuit and a first sampling module, the first pulse shaping circuit receives and then shapes a transimpedance-amplified echo signal, and the first sampling module samples a shaped echo signal and outputs a sampling signal.

The echo signal includes the stray light signal and the detection echo signal, and the first pulse shaping circuit receives the transimpedance-amplified echo signal for shaping. In some embodiments, the first pulse shaping circuit filters out a low-frequency part of the echo signal and compresses the pulse width of the echo signal, to ensure that the stray light signal and the detection echo signal can quickly recover to zero after reaching the peak, that is, time of the falling region B of the stray light signal and the detection echo signal also becomes very short, so that the stray light signal and the detection echo signal are separated from each other and the detection echo signal is not overlapped with the falling region B of the stray light signal. The first pulse circuit outputs the shaped echo signal to a first sampling module.

The first sampling module receives the shaped echo signal, samples the echo signal, and outputs a sampled signal. In some embodiments, the first sampling module performs analog-to-digital conversion on the echo signal to obtain a digitally quantized echo signal, identifies the detection echo signal from the digitally quantized echo signal, and obtains the sampled signal accordingly. A comparator can also be used to set a comparison threshold, the echo signal output by the transimpedance amplification circuit is converted into a digital pulse signal, the detection echo signal is identified from the digital pulse signal, and the sampled signal is obtained accordingly. The sampled signal is a time, amplitude, and the like of the received detection echo. The distance between the LiDAR and the target object and coordinate positions thereof can be calculated based on the time when the detection echo is received, and surface information such as the reflectivity of the target object can be calculated based on the amplitude of the received detection echo signal. Because the overlapping of the stray light signal and the detection echo signal is reduced after the echo signal is processed by the first pulse shaping circuit, the first sampling module can accurately identify the detection echo signal during sampling, and output the sampled signal. After the first pulse shaping circuit shapes the echo signal, the stray light signal and the detection echo signal are easy to identify, the first measurement circuit receives the shaped echo signal and can accurately identify the detection echo signal from the shaped echo signal, and the first sampling module samples the detection echo and outputs the sampled signal, and accurately outputs information about the short-distance detection echo.

In an embodiment, the at least two measurement circuits further include a second measurement circuit, the second measurement circuit includes a second pulse shaping circuit and a second sampling module, the second pulse shaping circuit receives and then shapes a transimpedance-amplified echo signal, and the second sampling module samples a shaped echo signal and outputs a sampling signal. An echo signal processing procedure of the second measurement circuit is similar to that of the first measurement circuit. Details are not described herein again.

The pulse width compression of the second pulse shaping circuit is lower than the pulse width compression of the first pulse shaping circuit, and the pulse width compression performed by the second pulse shaping circuit on the stray light signal and the detection echo signal in the echo signal is less than the pulse width compression performed by the first pulse shaping circuit on the stray light signal and the detection echo signal in the echo signal. As mentioned above, it should be understood that the stray light signal output by the receiver and the detection echo signal are overlapped with each other, thereby causing a blind spot for short-distance detection of the LiDAR. The laser ranging system records a time difference between laser pulse emission and detection echo receiving, to calculate the detection distance, so that the time difference directly corresponds to the detection distance. An emission time of the laser pulse is usually used as a start time of a detection cycle, that is, $T_e=0$. The time difference is equal to a receiving time of the detection echo. The minimum value of the receiving time range of the detection echo corresponding to the blind spot of short-distance detection is 0 second, and the maximum value thereof is the near-quenching time of the stray light signal. The near-quenching time of the stray light signal is a time when the detection echo signal can be identified from the falling region B of the stray light signal, that is, a difference between the amplitude of the stray light signal at this time and amplitude of the detection echo signal is greater than the minimum resolution of a back-end device. A value of the specific amplitude difference is determined by the performance of the back-end device. The first pulse shaping circuit can compress the pulse width of the stray light signal and the detection echo signal in the echo signal, so that the stray light signal can be quickly quenched in a short period of time, which advances the near-quenching time of the stray light signal, that is, narrows the blind spot for the short-distance detection. However, the pulse width compression performed by the second pulse shaping circuit on the stray light signal is lower than the pulse width compression performed by the first pulse shaping circuit on the stray light signal. The falling region B of the echo signal shaped and then output by the second pulse shaping circuit has greater length, and therefore, a near-quenching time of the stray light signal shaped by the second pulse shaping circuit is greater than a near-quenching time of the stray light signal shaped by the first pulse shaping circuit. A blind spot range of the short-distance detection of the echo signal shaped by the second pulse shaping circuit is greater than a blind spot range of the short-distance detection of the echo signal shaped by the first pulse shaping circuit.

Figure 4A:
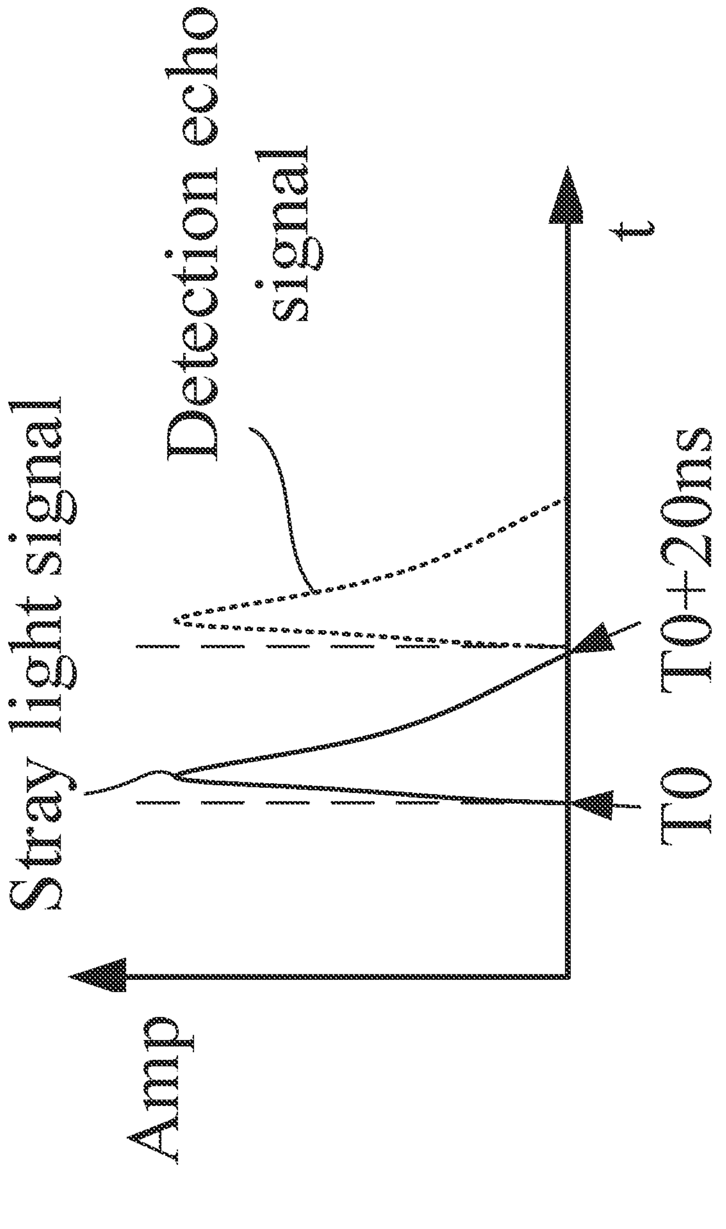
FIG. 4*a* is a waveform diagram of an output signal of a first pulse shaping circuit according to an embodiment of this application.
Figure 4B:
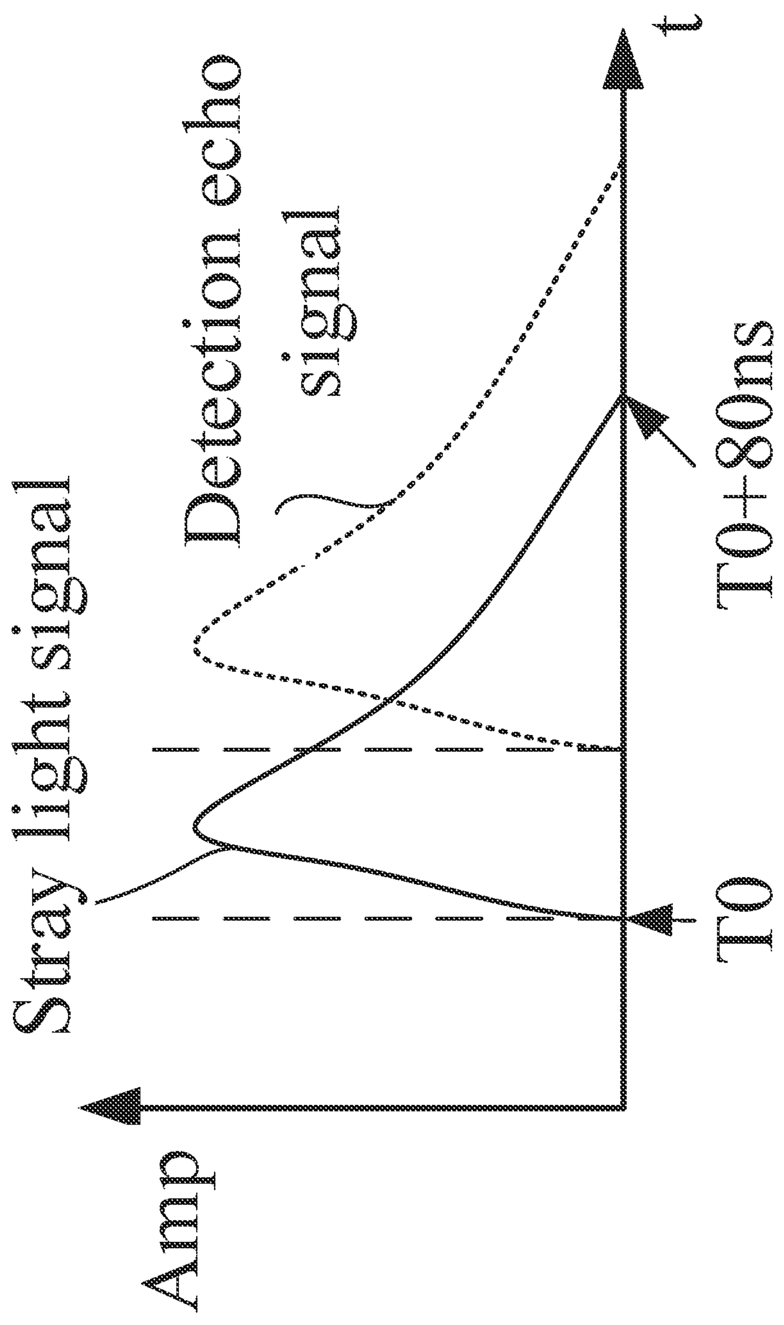
FIG. 4*b* is a waveform diagram of an output signal of a second pulse shaping circuit according to an embodiment of this application.

Taking the stray light signal and the detection echo signal shown in FIG. 1*b* as an example, FIG. 4*a* is a waveform diagram of an output signal of a first pulse shaping circuit according to an embodiment of this application, a solid-line waveform shown in the figure is a waveform of the stray light signal shaped by the first pulse shaping circuit, and a dashed-line waveform shown is a waveform of the detection echo signal shaped by the first pulse shaping circuit. It can be learned from a comparison between waveforms shown in FIG. 1*b* and FIG. 4*a* that after the stray light signal and the detection echo signal shown in FIG. 1*b* are shaped by the first pulse shaping circuit, the pulse width of the stray light signal and the detection echo signal is greatly compressed, and the stray light signal can be quickly quenched after reaching the peak, thereby greatly reducing a blind spot range of the short-distance detection caused by the stray light signal. Further referring to FIG. 4*b*, FIG. 4*b* is a waveform diagram of an output signal of a second pulse shaping circuit according to an embodiment of this application. The solid-line waveform shown in the figure is a waveform of the stray light signal shaped by the second pulse shaping circuit. The dashed-line waveform is a waveform of the detection echo signal shaped by the second pulse shaping circuit. It can also be learned from a comparison between a waveform shown in FIG. 4*a* and a waveform shown in FIG. 4*b* that pulse width compression performed by the second pulse shaping circuit on the echo signal is less than pulse width compression performed by the first pulse shaping circuit on the echo signal. The second pulse shaping circuit shapes the stray light signal, which can also reduce a blind spot for short-distance detection, but the laser ranging system processing the echo signal by using the first pulse shaping circuit has a smaller blind spot for short-distance detection.

For example, the first pulse shaping circuit reduces the near-quenching time of the stray light signal to 20 nanoseconds, and 20 nanoseconds after the laser beam emission, received detection echo signals can all be accurately identified and used to calculate the distance. Assuming that a distance between the LiDAR and the target object corresponding to the detection echo signal received 20 nanoseconds after the laser beam emission is 3 meters, after the echo signal is shaped by the first pulse shaping circuit, the blind spot of short-distance detection of the laser ranging system ranges from 0 to 3 meters. Correspondingly, the second pulse shaping circuit reduces the near-quenching time of the stray light signal to 80 nanoseconds, and 80 nanoseconds after the laser beam emission, the received detection echo signal can be accurately identified and used to calculate the distance. Assuming that a distance between the LiDAR and the target object corresponding to the detection echo signal received 80 nanoseconds after the laser beam emission is 12 meters, after the echo signal is shaped by the second pulse shaping circuit, the blind spot of short-distance detection of the laser ranging system ranges from 0 to 12 meters.

In some embodiments, the pulse width compression of the second pulse shaping circuit is lower than the pulse width compression of the first pulse shaping circuit.

It can be learned from the foregoing description that the stray light signal and the detection echo signal in the echo signal corresponding to the target object at the short distance are relatively close in time, and in the waveform diagram of the echo signal, more stray light signals and detection echo signals are overlapped, which makes it more difficult to identify the detection echo signal. Therefore, using the first pulse shaping circuit with greater pulse width compression can greatly reduce the pulse width of the stray light signal and the detection echo signal in the waveform of the echo signal, so that the waveform of the stray light signal and the waveform of the detection echo signal are less overlapped, thereby correspondingly implementing accurate identification of the detection echo signal accurately and calculating an accurate ranging result. In addition, energy attenuation caused due to transmission of the detection echo reflected by the target object at the short distance in the air is reduced, and the detection echo signal output after the detection echo passes through the receiver has a larger amplitude. Therefore, the detection echo signal corresponding to the target object at the short distance needs a small gain. The detection echo signal with the small gain amplified can not only be effectively identified and sampled, but also prevent signal distortion caused by oversaturation, thereby affecting determining of a peak position of the detection echo signal. The transimpedance amplification circuit has limited gains. After the detection echo signal output by the receiver is amplified by the transimpedance amplification circuit, an amplified detection echo signal can be directly input into the first measurement circuit for pulse shaping and sampling.

The stray light signal and the detection echo signal in the echo signal corresponding to the target object at the long distance are far spaced on a time axis. In the waveform diagram of the echo signal, the stray light signal and the detection echo signal are not overlapped, and the stray light signal does not affect the identification of the detection echo signal. Therefore, the second pulse shaping circuit with small pulse width compression is selected to perform pulse shaping on the echo signal, thereby also effectively identifying the detection echo signal. In addition, energy attenuation caused due to long-distance transmission of the detection echo corresponding to the target object at the long distance in the air is increased, and the detection echo signal output after the detection echo passes through the receiver has a smaller amplitude, and is difficult to identify when outnumbered by background noise. Therefore, the detection echo signal corresponding to the target object at the long distance needs a large gain, so that the detection echo signal can be identified by the back-end device. Because the transimpedance amplification circuit has limited gain, an amplifier can be further provided on the second measurement circuit. The detection echo corresponding to the target object at the long distance is initially amplified by the transimpedance amplification circuit, enters the second measurement circuit, and then is input to the second pulse shaping circuit after being re-amplified by the amplifier of the second measurement circuit.

In some embodiments, because the stray light signal and the detection echo signal do not interfere with each other during long-distance detection, the pulse width compression of the second pulse shaping circuit can also be 0, that is, the second pulse shaping circuit does not shape the input echo signal. The second sampling module directly samples the original echo signal amplified by the transimpedance amplification circuit.

In some embodiments, the laser receiving system may also include only one measurement circuit, that is, the first measurement circuit. The first pulse shaping circuit can be set to target pulse width compression as required. Exemplarily, the first detection period of the laser receiving system is used for the detection of a short-distance region, and the second detection period is used for the detection of a long-distance region. When determining based on a clock signal that the first detection period is currently used, the controller sends an increasing indication signal to the first pulse shaping circuit to increase pulse width compression of the first pulse shaping circuit; or when determining based on a clock signal that the second detection period is currently used, the controller sends a decreasing indication signal to the first pulse shaping circuit to decrease pulse width compression of the first pulse shaping circuit. There may also be another method for determining the target pulse width compression of the first pulse shaping circuit. This is not limited herein. In the method, the number of occupied components in the laser receiving system can be reduced, but a higher requirement is also imposed on the response rate of the component.

In some embodiments, the receiver receives an echo laser beam and outputs an echo signal. The echo signal output by the receiver is the transimpedance amplified by the transimpedance amplification circuit and then enters the measurement circuit. The pulse width shaping circuit in the measurement circuit performs pulse width shaping on the echo signal, and compresses the pulse width of the stray light signal and the detection echo signal in the echo signal, to separate the stray light signal from the detection echo signal, and then a sampling module in the measurement circuit can accurately identify the peak of the detection echo signal, and accurately output information about the detection echo, thereby solving the problem that ranging cannot be performed because of energy of the stray light, and ensuring ranging stability and accuracy of the LiDAR.

Figure 5:
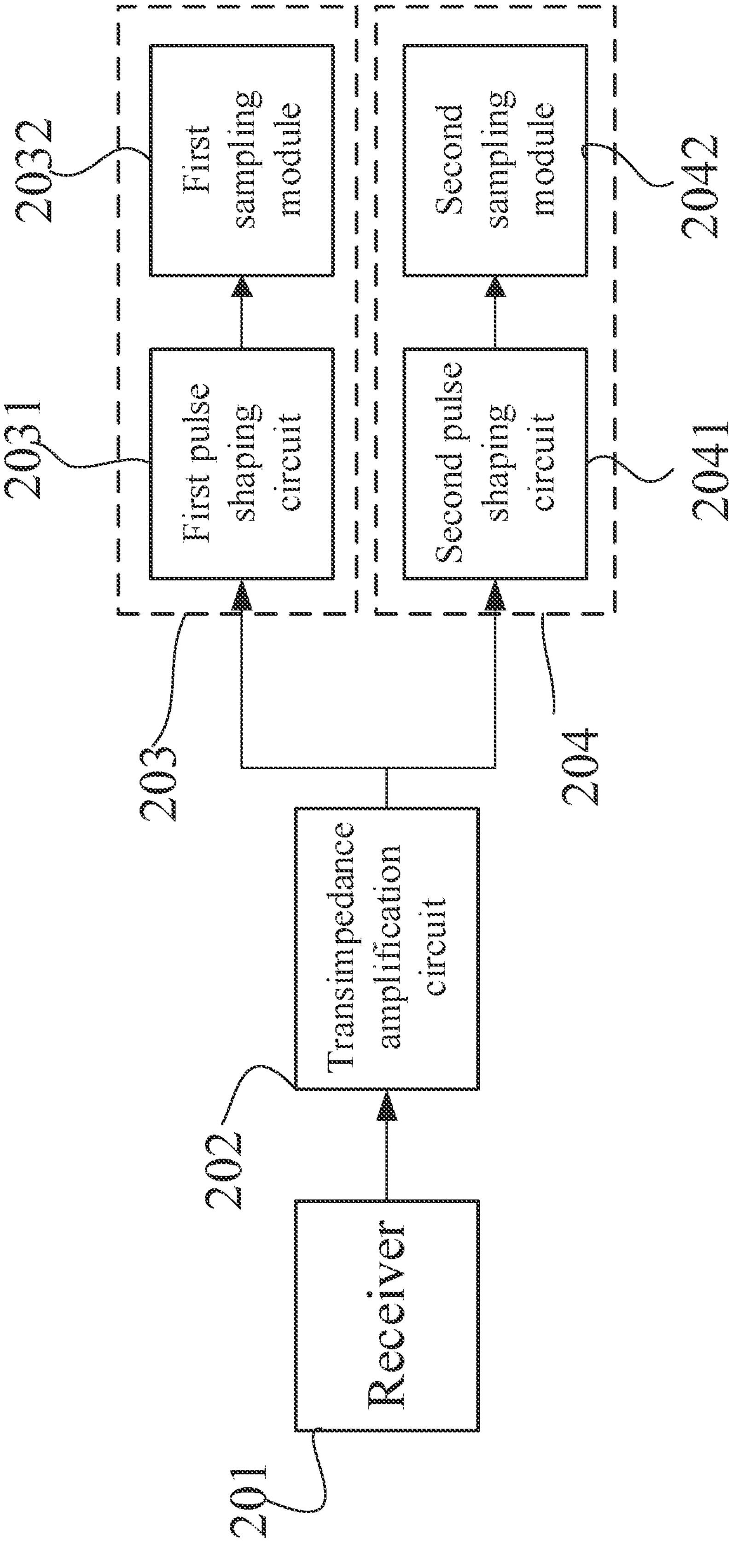
FIG. 5 is a systematic schematic diagram of a laser receiving system according to an embodiment of this application.

FIG. 5 is a systematic schematic diagram of a laser receiving system according to an embodiment of this application. As shown in FIG. 5, the laser receiving system includes a receiver 201, a transimpedance amplification circuit 202, a first measurement circuit 203, and a second measurement circuit 204. The first measurement circuit 203 includes a first pulse shaping circuit 2031 and a first sampling module 2032, and the second measurement circuit 204 includes a second pulse shaping circuit 2041 and a second sampling module 2042.

The receiver is connected to a terminal of the transimpedance amplification circuit, and is configured to receive an echo laser beam and output an echo signal.

A terminal of the transimpedance amplification circuit is connected to the receiver, another terminal of the transimpedance amplification circuit is respectively connected to a terminal of the first pulse shaping circuit in the first measurement circuit and a terminal of the second pulse shaping circuit in the second measurement circuit, and the transimpedance amplification circuit is configured to perform transimpedance amplification on the echo signal.

Another terminal of the first pulse shaping circuit is connected to the first sampling module, the first pulse shaping circuit is configured to receive and shape a transimpedance-amplified echo signal, and the first sampling module samples a shaped echo signal and outputs a sampling signal.

Figure 6:
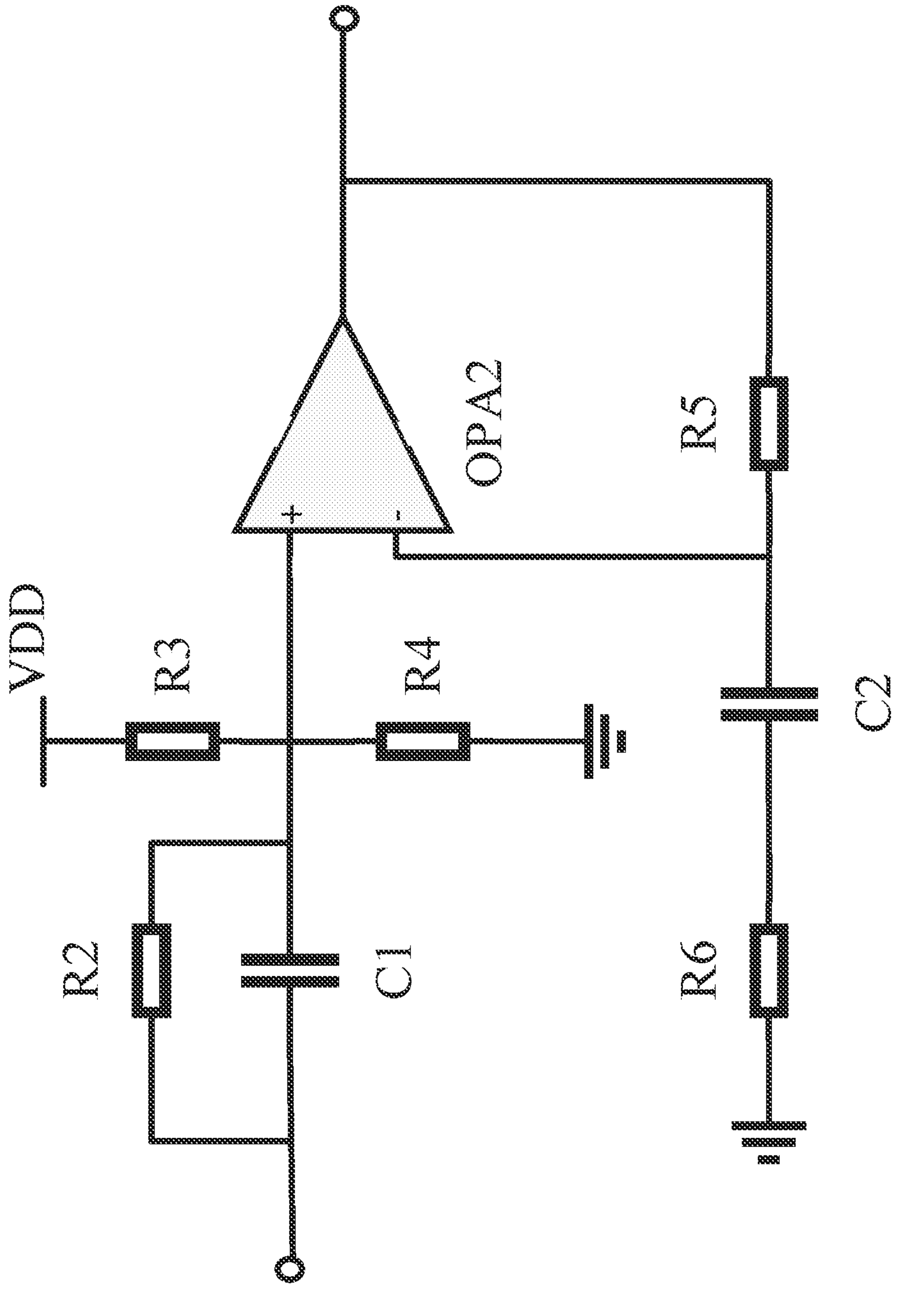
FIG. 6 is a schematic diagram of an example of a first pulse shaping circuit according to an embodiment of this application.

FIG. 6 is a schematic diagram of an example of a first pulse shaping circuit according to an embodiment of this application. As shown in FIG. 6, the first pulse shaping circuit includes a second operational amplifier OPA2, a second resistor R2, a third resistor R3, a fourth resistor R4, a fifth resistor R5, sixth resistor R6, a first capacitor C1, a second capacitor C2, and a second direct current voltage source VDD.

A non-inverting input terminal of the second operational amplifier OPA2 is connected to a terminal of the second resistor R2, a terminal of the first capacitor C1, a terminal of the third resistor R3, and a terminal of the fourth resistor R4. Another terminal of the second resistor R2 is connected to another terminal of the first capacitor C1 and the transimpedance amplification circuit, and another terminal of the third resistor R3 is connected to the second direct current voltage source VDD, and another terminal of the fourth resistor R4 is grounded. An inverting input terminal of the second operational amplifier OPA2 is connected to a terminal of the fifth resistor R5 and a terminal of the second capacitor C2, another terminal of the second capacitor C2 is connected to a terminal of the sixth resistor R6, and another terminal of the sixth resistor R6 is grounded. An output terminal of the second operational amplifier OPA2 is connected to another terminal of the fifth resistor R5 and the first sampling module.

Figure 7:
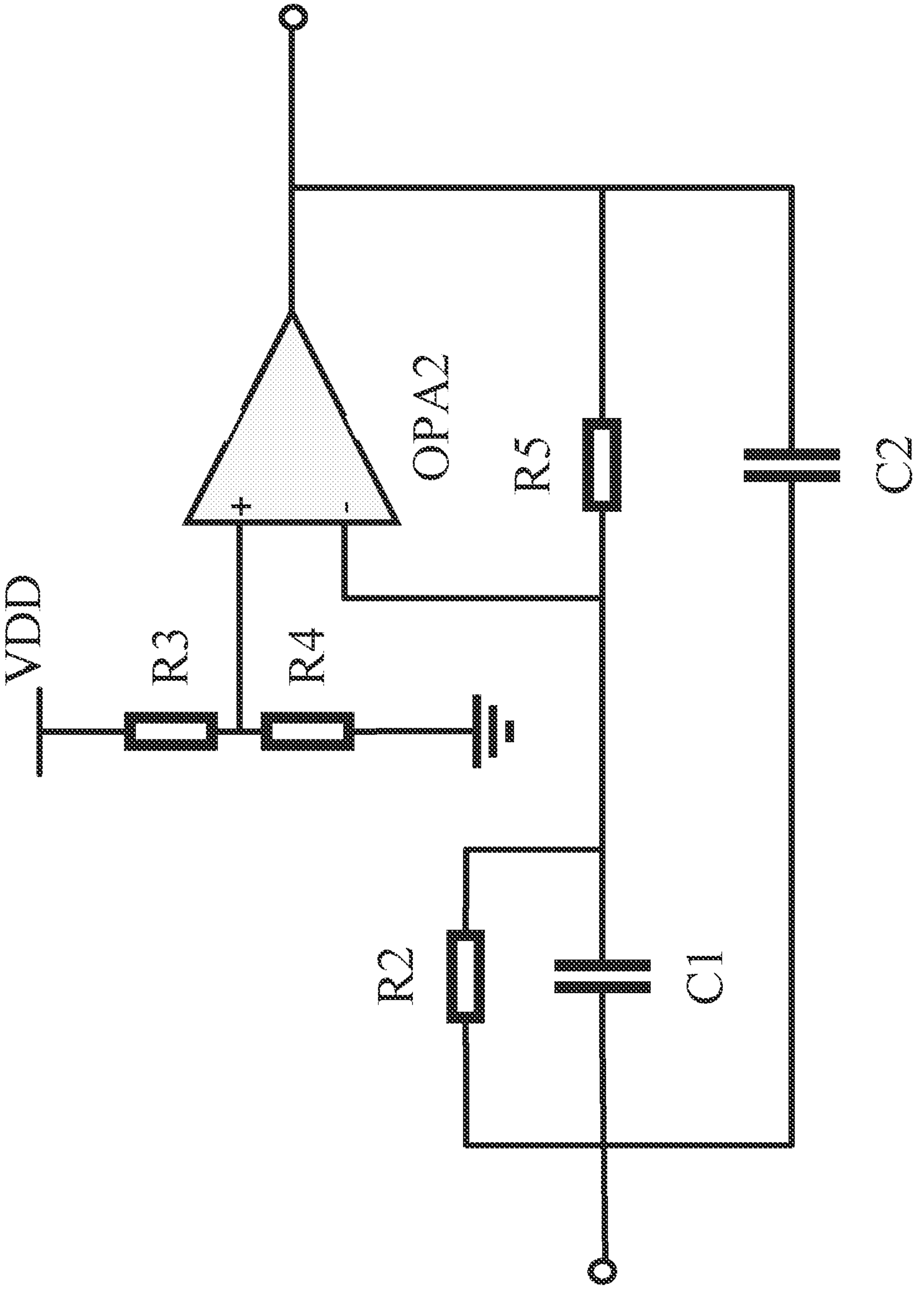
FIG. 7 is a schematic diagram of an example of a first pulse shaping circuit according to an embodiment of this application.

FIG. 7 is a schematic diagram of an example of another first pulse shaping circuit according to an embodiment of this application. As shown in FIG. 7, the first pulse shaping circuit includes a second operational amplifier OPA2, a second resistor R2, a third resistor R3, a fourth resistor R4, a fifth resistor R5, a first capacitor C1, a second capacitor C2 and a second direct current voltage source VDD.

The non-inverting input terminal of the second operational amplifier OPA2 is connected to a terminal of the third resistor R3 and a terminal of the fourth resistor R4, another terminal of the third resistor R3 is connected to the second direct current voltage source VDD, and another terminal of the fourth resistor R4 is grounded. The inverting input end of the second operational amplifier OPA2 is connected to a terminal of the second resistor R2, a terminal of the first capacitor C1, and a terminal of the fifth resistor R5, and another terminal of the second resistor R2 is connected to another terminal of the first capacitor C1, a terminal of the second capacitor C2 and the transimpedance amplification circuit. An output end of the second operational amplifier OPA2 is connected to another terminal of the fifth resistor R5, another terminal of the second capacitor C2 and the first sampling module.

Another terminal of the second pulse shaping circuit is connected to a terminal of the second sampling module, the second pulse shaping circuit is configured to receive and shape a transimpedance-amplified echo signal, and the second sampling module samples a shaped echo signal and outputs a sampling signal.

A specific circuit topology structure of the second pulse shaping circuit is similar to circuit topology structures of the first pulse shaping circuits shown in FIG. 6 or FIG. 7. Details are not described herein again. When the circuit topology structure of the second pulse shaping circuit is the same as that in the embodiment shown in FIG. 6, an output terminal of the second operational amplifier OPA2 is connected to another terminal of the fifth resistor R5 and the second sampling module. When the circuit topology structure of the second pulse shaping circuit is the same as that in the embodiment shown in FIG. 7, an output terminal of the second operational amplifier OPA2 is connected to another terminal of the fifth resistor R5, another terminal of the second capacitor C2 and the second sampling module.

In some embodiments, the receiver receives an echo laser beam and outputs an echo signal. The echo signal output by the receiver is transimpedance amplified by the transimpedance amplification circuit and then enters the measurement circuit. The pulse width shaping circuit in the measurement circuit performs pulse width shaping on the echo signal, and compresses the pulse width of the stray light signal and the detection echo signal in the echo signal, to separate the stray light signal from the detection echo signal, and then a sampling module in the measurement circuit can accurately identify the detection echo signal, and output a sampled signal of the detection echo, thereby solving the problem that detection cannot be accurately performed because of energy of the stray light, and ensuring ranging stability and accuracy of the LiDAR.

It can be learned from the foregoing embodiments that after the laser receiving system performs shaping on the echo signal, the pulse width of the stray light signal can be reduced, so that the waveform of the stray light signal is narrowed, the stray light signal is quickly quenched and the quenching time of the stray light signal is shortened, thereby further reducing the blind spot of the short-distance detection. However, the blind spot of the short-distance detection cannot be completely eliminated.

This application provides a laser ranging system, where the laser ranging system includes a laser emission system, the laser receiving system described in the foregoing embodiments, and a digital processing unit.

The laser emission system is used to emit a laser pulse, a detection period of the laser ranging system includes a first detection period and a second detection period in sequence, the laser emission system emits a secondary laser pulse in the first detection period, the laser emission system emits a primary laser pulse in the second detection period, a start time of the first detection period is earlier than a start time of the second detection period, and power of the secondary laser pulse is less than the power of the primary laser pulse.

The digital processing unit is configured to calculate the sampling signal output by the laser receiving system and then output target information.

As shown in the foregoing embodiments and FIG. 5, the laser receiving system includes a receiver 201, a transimpedance amplification circuit 202, a first measurement circuit 203, and a second measurement circuit 204. The first measurement circuit 203 includes a first pulse shaping circuit 2031 and a first sampling module 2032, and the second measurement circuit 204 includes a second pulse shaping circuit 2041 and a second sampling module 2042. The composition and functions of the laser receiving system are similar to those of the laser receiving system described in the foregoing embodiments. Details are not described again herein.

In some embodiments, at a preset moment of the first detection period, the laser emission system emits a secondary laser pulse, and the receiver of the laser receiving system receives a corresponding secondary echo laser beam; and at a preset moment of the second detection period, the laser emission system emits the primary laser pulse, the receiver of the laser receiving system receives a corresponding primary echo laser beam. An end moment of the first detection period is equal to a start moment of the second detection period, and the duration of the first detection period is greater than or equal to the time for photons to travel from the laser ranging system, to the farthest detection distance of the secondary laser pulse, and back to the laser ranging system. That is, after the secondary echo laser beam traveling back from the farthest detection distance is received in the first detection period, the primary laser pulse is emitted in the second detection period. This can avoid confusion of the detection periods of the secondary echo laser beam and the primary echo laser beam after their return to the receiver.

In some embodiments, the start moment of the second detection period may also be earlier than the end moment of the first detection period. Because the emission of the secondary laser pulse is related to that of the primary laser pulse, an emission encoding method may be used to distinguish detection periods of the echo laser beams after decoding in the laser receiving system.

After the secondary laser pulse reaches the target object and the secondary echo laser beam is reflected by the target object, the secondary echo laser beam is received by the receiver of the laser receiving system, and the receiver outputs the secondary echo signal after receiving the secondary echo laser beam.

The lower the power of the secondary laser pulse, the less the stray light generated on the stray light path during the emission of the secondary laser pulse. After a small amount of stray light reaches the receiver, the receiver is not excited to generate a stray light signal. The receiver outputs a detection echo signal after receiving the normal detection echo. Therefore, the secondary echo signal output by the receiver only includes the detection echo signal. A back-end measurement circuit of the receiver can accurately distinguish the detection echo signal from the secondary echo signal, and output a sampled signal based on the detection echo signal. Therefore, the stray light signal does not affect the detection echo signal, a detection echo signal returning from the short-distance region can also be accurately sampled and output as the sampled signal, and there is no short-distance blind spot. In addition, the smaller the power of the secondary laser pulse, the smaller the ranging capability of the laser ranging system in the first detection period. Combined with characteristics of emission and reception in the first detection period, the laser ranging system can accurately detect the short-distance region in the first detection period without a detection blind spot.

The transimpedance amplification circuit amplifies the signal amplitude of the secondary echo signal to obtain a primarily amplified secondary echo signal. The secondary laser pulse has small emission power, but the secondary echo laser beam returning from the short-distance region has a small loss, and the transimpedance amplification circuit achieves a small primary amplification gain for the secondary echo signal, to avoid oversaturation of the amplified secondary echo signal. In addition, the gain should not be excessively small, so that the secondary echo signal returning from the farthest detection distance can be identified and sampled after being amplified. Exemplarily, a ranging distance in the first detection period ranges from 0 to 3 meters, then a secondary echo laser beam returning from the 3-meter distance has the weakest energy, and the corresponding secondary echo signal also has the smallest amplitude. The secondary echo signal can be sampled by the sampling module after being primarily amplified.

Further, the transimpedance amplification circuit is configured to not only primarily amplify the secondary echo signal, but also convert a secondary echo signal in a form of current into a secondary echo signal in a form of voltage, to easily perform measurements.

In some embodiments, the transimpedance amplification circuit is connected to the first measurement circuit and the second measurement circuit respectively, and the pulse width compression of the second pulse shaping circuit in the second measurement circuit is lower than the pulse width compression of the first pulse shaping circuit in the first measurement circuit. Further, after the transimpedance amplification circuit performs the transimpedance amplification on the secondary echo signal, the transimpedance-amplified secondary echo signal can be measured by both the first measurement circuit and the second measurement circuit, and the first sampling signal and the second sampling signal are output respectively.

It can be understood that because the secondary laser pulse does not generate a stray light signal, regardless of whether the secondary echo signal is measured by the first measurement circuit or the second measurement circuit, the detection echo signal can be always accurately identified, to obtain a sampled signal applicable to accurate ranging. The digital processing unit outputs the first target distance after calculation based on the first sampled signal output by the first measurement circuit and/or the second sampled signal output by the second measurement circuit, and the first target distance is a distance between the LiDAR and the target object.

In some embodiments, because there is no interfering stray light signal in the secondary echo signal, the back-end measurement circuit can directly sample the secondary echo signal and output the sampled signal. Therefore, the pulse width shaping of the second pulse shaping circuit can be 0; that is, the second measurement circuit does not include the second pulse shaping circuit, and the primarily amplified secondary echo signal output by the transimpedance amplification circuit is directly input into the second sampling module; or the pulse width compression of the second pulse shaping circuit is adjustable and is set to 0, and the second pulse shaping circuit does not perform any processing on the secondary echo signal.

Further, when the pulse width compression of the second pulse shaping circuit is 0, the secondary echo signal processed in the second measurement circuit is an unfiltered original signal, and the first reflectivity of the target object can be calculated based on the second sampled signal output after the secondary echo signal passes through the second measurement circuit. The reflectivity refers to a ratio of radiant energy reflected by the object to total radiant energy. Different objects also have different reflectivity, which mainly depends on a feature (surface condition) of the object, and wavelength and an incident angle of the incident electromagnetic wave, and a range of the reflectivity is always less than or equal to 1, and the surface condition of the object can be determined by using the reflectivity. Generally, the larger the reflectivity, the stronger the reflecting capacity; and conversely, the smaller the reflectivity, the weaker the reflecting capacity. In some embodiments, the feature of the target object can be determined based on the first reflectivity.

After the laser ranging system emits the secondary laser pulse, the secondary echo laser beam is photoelectrically converted by the receiver to output the secondary echo signal, the secondary echo signal is divided into two parts to be separately input to the first measurement circuit and the second measurement circuit, and the first sampled signal and the second sampled signal are output. Based on the first sampled signal, the distance of the target object at the short distance can be obtained without a blind spot. For example, a ranging interval of the laser ranging system is 0 to 3 meters. Based on the second sampled signal, the distance and the first reflectivity of the target object at the short distance can be obtained. For example, a ranging interval of the laser ranging system is 0 to 3 meters, and the first reflectivity of a target object within 0 to 3 meters can be obtained. Combined with the first measurement circuit and the second measurement circuit, the laser ranging system can obtain the distance and the first reflectivity of the target object within 0 to 3 meters in the detection period corresponding to the secondary laser pulse.

The laser emission system emits the primary laser pulse in the second detection period. After the primary laser pulse reaches the target object and the primary echo laser beam is reflected by the target object, the primary echo laser beam is received by the receiver of the laser receiving system, and the receiver outputs the primary echo signal after receiving the primary echo laser beam.

The greater the power of the primary laser pulse is, the more stray light is generated on the stray light path during the emission of the primary laser pulse. After a large amount of stray light first reaches the receiver, the receiver is not excited to generate a stray light signal. Then the receiver receives the normal detection echo and outputs a detection echo signal. Therefore, the primary echo signal output by the receiver includes the stray light signal and the detection echo signal. When the receiver receives stronger stray light, specific time is required from self-excitation to quenching of the output stray light signal. During the near-quenching time of the stray light, the receiver outputs the detection echo signal. In this case, the detection echo signal and the stray light signal are overlapped with each other, thereby causing the foregoing problem that the detection echo signal is unidentifiable and causing a blind spot for short-distance detection. However, the greater the power of the primary laser pulse, the better the ranging capability of the laser ranging system in the second detection period. Combined with characteristics of emission and reception in the second detection period, the laser ranging system accurately ranges a target object at a middle-to-far distance in the second detection period with a blind spot in the short-distance region.

The transimpedance amplification circuit amplifies the signal amplitude of the primary echo signal to obtain a primarily amplified primary echo signal. Related descriptions of the transimpedance amplification circuit are similar to those in the foregoing embodiment. Details are not described herein again.

In some embodiments, the transimpedance amplification circuit is connected to the first measurement circuit and the second measurement circuit respectively, and the pulse width compression of the second pulse shaping circuit in the second measurement circuit is lower than the pulse width compression of the first pulse shaping circuit in the first measurement circuit. Further, after the transimpedance amplification circuit performs transimpedance amplification on the primary echo signal, the transimpedance-amplified primary echo signal can be measured by both the first measurement circuit and the second measurement circuit, and the third sampling signal and the fourth sampling signal are output respectively.

It can be understood that because the primary laser pulse generates stronger stray light, the stray light signal in the primary echo signal more severely blocks the detection echo signal, thereby affecting the identification of the detection echo signal. Therefore, the primary echo signal is shaped to distinguish the stray light signal from the detection echo signal in the primary echo signal. The primary echo signal is respectively processed by the first measurement circuit and the second measurement circuit. It can be learned from the foregoing embodiments that, the shaping of the first pulse shaping circuit is greater than the shaping of the second pulse shaping circuit. The primary echo signal is output after signal processing of the first pulse shaping circuit, and the detection echo signal can be more early distinguished and identified after sampling, that is, there are fewer blind spots for short-distance detection. For example, the laser ranging system does not shape the primary echo signal, and has a ranging interval of 10 to 200 meters. After shaping the primary echo signal in a low degree by using the second pulse shaping circuit, the laser ranging system has a ranging interval of 5 to 200 meters, and after shaping the primary echo signal in a great degree by using the first pulse shaping circuit, the laser ranging system has a ranging interval of 3 to 200 meters. The digital processing unit outputs the second target distance after calculation based on the third sampled signal output by the first measurement circuit and/or the fourth sampled signal output by the second measurement circuit, and the second target distance is a distance between the LiDAR and the target object.

In some embodiments, the pulse width compression of the second pulse shaping circuit in the second measurement circuit may be 0. It can be learned from the foregoing description that primary amplification of the transimpedance amplification circuit achieves a small gain, and after the primary echo signal is primarily amplified by the transimpedance amplification circuit, saturation distortion of the output waveform does not occur, and an original waveform characteristic still remains, for example, signal amplitude and area information. In some embodiments, the primary echo signal is processed by the second measurement circuit to obtain a fourth sampling signal, and the digital processing unit calculates the second reflectivity of the target object based on the fourth sampled signal.

In some embodiments, a secondary amplifier may also be arranged between the second pulse shaping circuit and the second sampling module, and is configured to further amplify a shaped primary echo signal. An input terminal of the secondary amplifier is connected to an output terminal of the second pulse shaping circuit, and an output terminal of the secondary amplifier is connected to an input terminal of the second sampling module. Because the detection echo is transmitted over a longer distance and more greatly attenuates, the primary echo signal has a smaller amplitude, and therefore, the primary echo signal needs to be amplified for large gain to be identified by a back-end circuit and obtain accurate signal amplitude and area information. As mentioned above, the transimpedance amplification circuit achieves a small gain for the primary echo signal via the primary amplification, and a secondary amplifier can be disposed at the back end of the second pulse shaping circuit for further amplification. The primary amplification and the secondary amplification are combined to meet a gain requirement of the primary echo signal. Further, multiple amplifiers may be disposed between the second pulse shaping circuit and the second sampling module to meet the gain requirement of the primary echo signal. The number of amplifiers is not limited herein.

In the second detection period of the laser ranging system, the primary echo laser beam is photoelectrically converted by the receiver to output the primary echo signal, the primary echo signal is divided into two parts to be separately input to the first measurement circuit and the second measurement circuit, and the third sampled signal and the fourth sampled signal are output. After one primary echo signal is shaped by the first measurement circuit, the pulse width of the primary echo signal is reduced, and the stray light signal and the detection echo signal in the primary echo signal are separated, thereby reducing the impact of the stray light signal on the identification of the detection echo signal, and reducing the blind spot for short-distance detection. For example, after shaping the first measurement circuit, the ranging interval of the laser ranging system is 3 to 200 meters, and the blind spot for short-distance detection is 0 to 3 meters. After the other primary echo signal passes through the second measurement circuit, the primary echo signal still retains an original waveform characteristic, and second reflectivity of the target object is calculated based on the amplitude and area information of the primary echo signal. However, the stray light signal in the primary echo signal blocks the detection echo signal to a larger extent, and there is a larger blind spot for short-distance detection. For example, after shaping the second measurement circuit, the ranging interval of the laser ranging system is 10 to 200 meters, and second reflectivity of a target object in the range of 10 to 200 meters can be obtained. Combined with the first measurement circuit and the second measurement circuit, the laser ranging system can achieve accurate ranging in the range of 3 to 200 meters and obtain accurate second reflectivity in the range of 10 to 200 meters within a detection period corresponding to the primary laser pulse.

In some embodiments, the laser emission system emits a secondary laser pulse and a primary laser pulse with different powers respectively in the first detection period and the second detection period, and the laser ranging system ranges the target object at the short distance such as 0 to 3 meters based on the secondary laser pulse, and ranges the target object at the long distance such as 3 to 200 meters based on the primary laser pulse. The stray light caused by the secondary laser pulse does not excite the receiver to generate a stray light signal, and short-distance detection can be performed without an obstacle. Although the stray light caused by the primary laser pulse excites the receiver to generate the stray light signal, after shaping the laser receiving system, the blind spot for short-distance detection is reduced to a great extent. The primary laser pulse and the secondary laser pulse are combined to range the target object at the long distance and the target object at the short distance respectively, which eliminates the blind spot for short-distance detection. For example, the secondary laser pulse can be used to detect a region within 0 to 3 meters, and the primary laser pulse can be used to detect a region within 3 to 200 meters. The laser ranging system provided in some embodiments of this application solves the problem that ranging cannot be performed because of the energy of the stray light, and achieves full-coverage ranging without a blind spot, thereby ensuring ranging stability and accuracy of the LiDAR.

In an exemplary embodiment, the ranging method provided in this application can be used to detect an obstacle in an automatic driving scenario of a vehicle.

In the automatic driving scenario of the vehicle, a distance and a movement of an obstacle around the vehicle need to be detected in real time to ensure that the vehicle does not collide with the obstacle during automatic driving or cause an accident or economic loss.

Figure 8:
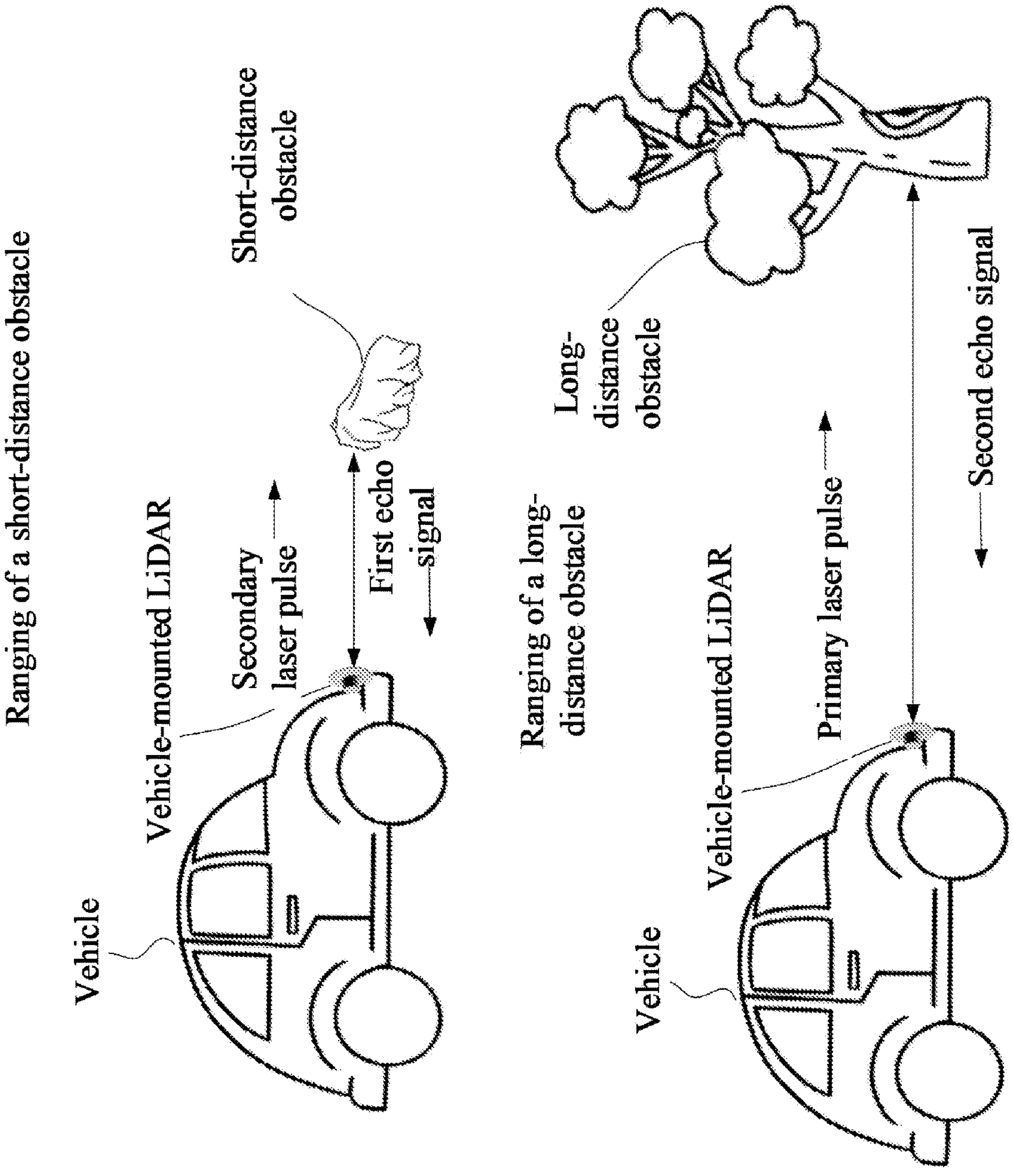
FIG. 8 is a diagram of an application scenario of obstacle detection and ranging according to an embodiment of this application.

FIG. 8 is a diagram of an application scenario of obstacle detection and ranging according to an embodiment of this application. As shown in FIG. 8, the application scenario of obstacle detection and ranging includes ranging of obstacles at a short distance and a long distance. When a LiDAR mounted on the vehicle ranges an obstacle at a short distance based on an emitted secondary laser pulse with low power, because the secondary laser pulse is emitted with lower power, output signal saturation caused by the energy of the stray light does not occur. The first echo signal corresponding to the secondary laser pulse can be detected, that is, the obstacle at the short distance can be ranged. When the LiDAR mounted on the vehicle ranges an obstacle at a long distance based on an emitted primary laser pulse with high power, because the transimpedance amplification circuit limits the gain, output saturation distortion does not occur, and on this basis, the second echo signal is further shaped to eliminate the impact of a stray light signal. In other words, a second echo signal corresponding to the primary laser pulse can be detected, that is, the obstacle at the long distance can be ranged.

In some embodiments, the ranging method provided in this application is applicable to robot vision, military, laser imaging, and some other scenarios that require laser ranging, in addition to the automatic driving scenario of the vehicle. Therefore, this is not limited in this application.

In the foregoing embodiments, the descriptions of the embodiments have respective focuses. For unspecified content in one embodiment, refer to related descriptions in other embodiments.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, the functional units in the embodiments of this application may be integrated into one processing unit, or each of the units may exist alone physically, or two or more units may be integrated into one unit. The integrated unit may be implemented in a form of hardware, or may be implemented in a form of a software functional unit.

The foregoing descriptions are only exemplary embodiments of this application, and should not be construed as a limitation on the scope of this application. That is, all equivalent changes and modifications made under the instruction of this application shall still fall within the scope of this application. A person skilled in the art can easily figure out another implementation solution of this application after considering this specification and practicing this disclosure. This application is intended to cover any variations, uses, or adaptive changes of this application. These variations, uses, or adaptive changes comply with general principles of this application, and include common knowledge or commonly used technical solutions in the technical field that are not disclosed in this application. This specification and embodiments should be considered to be exemplary only, and the scope and spirit of this application are defined by the claims.

What is claimed is:

1. A laser receiving system, comprising: a receiver, a transimpedance amplification circuit, and at least one measurement circuit, wherein the at least one measurement circuit comprises a first measurement circuit and a second measurement circuit, and wherein the receiver is connected to a terminal of the transimpedance amplification circuit, and is configured to receive an echo laser beam and output an echo signal;

the transimpedance amplification circuit has a terminal connected to the receiver and another terminal separately connected to each of the at least one measurement circuit, and is configured to perform transimpedance amplification on the echo signal;

the first measurement circuit comprises a first pulse shaping circuit and a first sampling module, the first pulse shaping circuit is configured to receive and then shape a transimpedance-amplified echo signal, and the first sampling module is configured to sample a shaped echo signal and output a sampling signal; and the second measurement circuit comprises a second pulse shaping circuit and a second sampling module, the second pulse shaping circuit is configured to receive and then shape a transimpedance-amplified echo signal, the second sampling module is configured to sample a shaped echo signal and output a sampling signal, and pulse width compression of the second pulse shaping circuit is lower than pulse width compression of the first pulse shaping circuit, wherein the first pulse shaping circuit comprises a second operational amplifier, a second resistor, a third resistor, a fourth resistor, a fifth resistor, a first capacitor, a second capacitor, and a second direct current voltage source, wherein:

a non-inverting input terminal of the second operational amplifier is connected to a terminal of the third resistor and a terminal of the fourth resistor, another terminal of the third resistor is connected to the second direct current voltage source, and another terminal of the fourth resistor is grounded;

an inverting input terminal of the second operational amplifier is connected to a terminal of the second resistor, a terminal of the first capacitor, and a terminal of the fifth resistor, and another terminal of the second resistor is connected to another terminal of the first capacitor, a terminal of the second capacitor, and the transimpedance amplification circuit; and an output terminal of the second operational amplifier is connected to another terminal of the fifth resistor, another terminal of the second capacitor, and the first sampling module.

2. The laser receiving system according to claim 1, wherein the transimpedance amplification circuit comprises an operational amplifier, a first direct current voltage source, and a first resistor, wherein a positive electrode of the operational amplifier is connected to the first direct current voltage source;

a negative electrode of the operational amplifier is grounded;

a non-inverting input terminal of the operational amplifier is connected to an output terminal of the receiver and a terminal of the first resistor;

an inverting input terminal of the operational amplifier is grounded; and an output terminal of the operational amplifier is connected to another terminal of the first resistor and the measurement circuit.

3. A laser ranging system, wherein the laser ranging system comprises the laser receiving system according to claim 1, a laser emission system, and a digital processing unit, wherein the laser emission system is used to emit a laser pulse;

a detection period of the laser ranging system comprises a first detection period and a second detection period in sequence;

the laser emission system is configured to emit a secondary laser pulse in the first detection period;

the laser emission system is configured to emit a primary laser pulse in the second detection period, wherein a start time of the first detection period is earlier than a start time of the second detection period, and power of the secondary laser pulse is less than power of the primary laser pulse; and the digital processing unit is configured to calculate the sampling signal output by the laser receiving system and then output target information.

4. The laser ranging system according to claim 3, wherein the laser receiving system is configured to receive a secondary echo laser beam corresponding to the secondary laser pulse and output a first sampling signal and a second sampling signal; and the digital processing unit is configured to perform calculations based on the first sampling signal or the second sampling signal and then output a first target distance, wherein the first sampling signal is output by the first measurement circuit, and the second sampling signal is output by the second measurement circuit.

5. The laser ranging system according to claim 4, wherein the digital processing unit is configured to perform the calculations based on the second sampling signal and then outputs first reflectivity.

6. The laser ranging system according to claim 3, wherein the laser receiving system is configured to receive a primary echo laser beam corresponding to the primary laser pulse and output a third sampling signal and a fourth sampling signal; and the digital processing unit is configured to perform calculations based on the fourth sampling signal and then output a second target distance, wherein the third sampling signal is output by the first measurement circuit, and the fourth sampling signal is output by the second measurement circuit.

7. The laser ranging system according to claim 6, wherein the digital processing unit is configured to perform calculations based on the fourth sampling signal and then output second reflectivity.

8. A laser receiving system, comprising: a receiver, a transimpedance amplification circuit, and at least one measurement circuit, wherein the at least one measurement circuit comprises a first measurement circuit and a second measurement circuit, and wherein the receiver is connected to a terminal of the transimpedance amplification circuit, and is configured to receive an echo laser beam and output an echo signal;

the transimpedance amplification circuit has a terminal connected to the receiver and another terminal separately connected to each of the at least one measurement circuit, and is configured to perform transimpedance amplification on the echo signal;

the first measurement circuit comprises a first pulse shaping circuit and a first sampling module, the first pulse shaping circuit is configured to receive and then shape a transimpedance- amplified echo signal, and the first sampling module is configured to sample a shaped echo signal and output a sampling signal; and the second measurement circuit comprises a second pulse shaping circuit and a second sampling module, the second pulse shaping circuit is configured to receive and then shape a transimpedance-amplified echo signal, the second sampling module is configured to sample a shaped echo signal and output a sampling signal, and pulse width compression of the second pulse shaping circuit is lower than pulse width compression of the first pulse shaping circuit, wherein the first pulse shaping circuit comprises a second operational amplifier, a second resistor, a third resistor, a fourth resistor, a fifth resistor, a sixth resistor, a first capacitor, a second capacitor, and a second direct current voltage source, wherein:

a non-inverting input terminal of the second operational amplifier is connected to a terminal of the second resistor, a terminal of the first capacitor, a terminal of the third resistor, and a terminal of the fourth resistor, another terminal of the second resistor is connected to another terminal of the first capacitor and the transimpedance amplification circuit, another terminal of the third resistor is connected to the second direct current voltage source, and another terminal of the fourth resistor is grounded;

an inverting input terminal of the second operational amplifier is connected to a terminal of the fifth resistor and a terminal of the second capacitor, another terminal of the second capacitor is connected to a terminal of the sixth resistor, and another terminal of the sixth resistor is grounded; and an output terminal of the second operational amplifier is connected to another terminal of the fifth resistor and the first sampling module.

* * * * *